Patented May 30, 1939

2,160,579

UNITED STATES PATENT OFFICE 2,160,579

INSECTICIDE

Friar M. Thompson, Jr., Wilmington, Del., assignor to Hercules Powder Company, Wilmington, Del., a corporation of Delaware No Drawing. Application April 28, 1937, Serial No. 139,612

9 Claims. (Cl. 167—24)

This invention relates to an insecticide and more particularly to an insecticide composition comprising a terpene ether.

I have found that terpene ethers, either alone or admixed with other materials are effective insecticides. I have found the very surprising fact that mixtures of terpene ethers with certain other insecticidal materials have far greater toxic action on insects than of either component of the mixtures alone. Terpene ethers have, then, a definite activating action on other insecticidal materials. I have also found that certain of the terpene ethers have a definite action in preventing the deterioration of other insecticides, such as, for example, the active principles of pyrethrum and rotenone bearing plants, etc., and prolonging their useful life.

The composition in accordance with this invention will comprise a terpene ether and a diluent. The diluent may be another toxic material, an admixture of other toxic materials, an inert carrier material, or an admixture of another toxic material and an inert carrier. The composition, in accordance with my invention, which I prefer is one comprising a terpene ether and another toxic material, admixed with an inert carrier material or suitable for admixture with an inert carrier material at the point of application.

The toxic material added to the terpene ether, where such is added, will be added in amount necessary to have the desired toxicity to insects and may be, for example, a contact poison to insects. Furthermore, it may be a synthetic compound or the active principles of a plant body. Suitable toxic materials for addition to the terpene ether are, for example, the active principles of pyrethrum or rotenone bearing plants; nicotine; nicotine compounds, as, nicotine sulfate, etc.; aliphatic thiocyanates, etc.

The inert carrier selected for use in compositions according to this invention may be varied, depending upon the method of application by which, and the purpose for which, the composition will ultimately be used. The composition in accordance with this invention can be used as a spray, a dusting powder, or as a paint or gum. The inert carrier used in compositions intended for application as a spray will be a liquid of the type commonly used as carrier liquid in insecticidal compositions, such as, for example, water, petroleum hydrocarbon fractions, as ordinary or deodorized kerosene, etc. The inert carrier used in compositions intended for application as a dust will be a finely divided solid of the type commonly used as a carrier for insecticidal dusts, such as, for example, talc, colloidal clays, bentonite, fuller's earth, etc. The carrier for compositions intended for use as a paint or gum may be, for example, a natural or residual asphalt.

Compositions for application as a spray may be utilized in the form of a solution or suspension. Such compositions will comprise a terpene ether, or a terpene ether and another insecticidal material, dissolved, or partially dissolved and partially suspended, in an inert carrier liquid which is a solvent for one or more of the active ingredients of the composition, such as, for example, a petroleum hydrocarbon fraction, as, deodorized or ordinary kerosene, etc. Such compositions are suitable for use in the control of insects, such as, flies, mosquitoes, roaches, bedbugs, fleas, silver fish, etc., infesting public buildings, restaurants, hotels, dwellings, warehouses, etc.

A typical composition of this type will consist of a solution prepared by dissolving the extractives of 1 pound of pyrethrum flowers in 1 gallon of a liquid containing 5%, by volume, of a terpene ether and 95%, by volume, of deodorized kerosene.

It will be appreciated that this composition is given merely by way of example and that the terpene ether, the other insecticide present and the carrier may be varied both as to the exact material used and as to the relative proportions used, in any desired manner depending upon the insecticidal efficiency desired. From a practical standpoint, it will be found that the maximum concentration which will be desirable when both insecticidal efficiency and economy are considered is 25%, by volume, of a terpene ether and the insecticidal equivalent of 5 pounds of the active principles of pyrethrum in one gallon of finished spray.

Compositions of this type may be prepared in concentrated form and diluted by the addition of carrier liquid at the point of application. By this means economies in transportation and handling can frequently be obtained, and such concentrates are within the scope of my invention. Concentrated extracts may be prepared by the direct extraction of pyrethrum flowers with a terpene ether or with a mixture consisting of a terpene ether and another extractor. Concentrates prepared in this way may be further diluted immediately after preparation, or at the point of use, as may be desired.

Compositions for application as a spray may also be utilized in the form of an aqueous emulsion. Such compositions will comprise a terpene ether, and desirably another insecticidal material, emulsified in water. Such emulsions will contain an emulsifying agent, such as, for example, a soap, a sulfonated oil, etc. They may be prepared in completely finished form at the point of manufacture, or they may be prepared in the form of a concentrate comprising a terpene ether, another insecticidal material and an emulsifying agent, and then diluted and emulsified with water at the point of application. By the latter procedure unnecessary packaging, transportation and handling of water is avoided, the advantages of which are readily apparent. Emulsified compositions of this type are advantageous for the destruction of insects attacking horticultural plants, such as, for example, the various kinds of plant lice, mealy bugs, thrips, the various kinds of scale insects, etc.

An emulsified insecticidal composition of a somewhat different type, but likewise advantageous for the destruction of insects on horticultural plants may also be prepared in accordance with this invention. This composition will comprise a terpene ether and a petroleum hydrocarbon oil of suitable viscosity say, of 30 sec. (Saybolt at 100° F.) or above, emulsified in water with the aid of an emulsifying agent. In such a composition the terpene ether enhances the insecticidal action of the oil.

The insecticidal compositions, in accordance with this invention, may also be used for the destruction of insects which attack agricultural or horticultural plants, in the form of an insecticidal dust. Terpene ethers alone or admixed with other toxic insecticidal materials, such as, for example, the extractives of pyrethrum flowers; rotenone bearing plants; nicotine; nicotine compounds, as nicotine sulfate; etc., may be thoroughly admixed with a powdered solid material of the type commonly used for insecticidal dusts, to produce such an insecticidal dust.

A typical composition of this type is, for example, talc ground to 200 mesh and incorporated with 1%, by weight, of a terpene ether and 1%, by weight, nicotine.

This composition is given merely as an illustration of my invention, and it will be appreciated that other insecticidal materials may be used instead of the nicotine, and other carriers used to replace the talc. It will also be understood that the proportions of the ingredients may be varied to suit the purpose for which the dust is intended. Thus, higher concentrations of the terpene ether and of the nicotine or other insecticidal material may be added to the powdered carrier, if a more toxic material is desired for a specific application or if the composition is intended to be diluted at the point of application by the addition of more powdered carrier. It will, of course, be appreciated that the maximum amount of the terpene ether and the other insecticidal material added is fixed by the inherent limitation that the dust must be free-flowing so that it may be readily applied to plants.

A highly active insecticidal dust of a somewhat different type may also be prepared in accordance with this invention. Such a dust will comprise a terpene ether incorporated into a powdered insecticidal material such as, for example, ground pyrethrum flowers, powdered derris root, powdered cubé, etc.

The terpene ethers used in the compositions in accordance with this invention are characterized by containing an ether linkage connecting a terpenic group with another group, and may be prepared in either of two ways. They may be prepared by the etherification of the hydroxyl group of a terpene alcohol with another alcohol, or they may be prepared by the direct addition of an alcohol to a double bond of an unsaturated terpene compound. The latter type ethers will, for convenience, be termed "additive" terpene ethers. The alcohol used as the etherifying agent may, in either method, be a monohydric alcohol or a polyhydric alcohol. The monohydric alcohol may be, for example, methyl alcohol, ethyl alcohol, propyl alcohol, butyl alcohol, amyl alcohol, ethylene glycol monoethyl ether, ethylene glycol monobutyl ether, diethylene glycol monoethyl ether, etc. The polyhydric alcohol may be, for example, ethylene glycol, diethylene glycol, glycerol, etc.

The terpene alcohol used to prepare a terpene ether by the etherification of its hydroxyl group may be any terpene alcohol having a reactive hydroxyl group, such as, for example, alpha terpineol, borneol, fenchyl alcohol, etc. Crude terpene cuts rich in terpene alcohols may likewise be etherified. Such ethers may be readily prepared by well known methods.

The unsaturated terpene compound used to prepare a terpene ether by the addition of an alcohol at a double bond may be, for example, alpha pinene, nopinene, dipentene, terpinene, terpinolene, phellandrene, sylvestrene, alpha, terpineol, beta terpineol, carene, camphene, bornylene, etc. These terpene compounds do not need to be in pure form, but may be reacted in the form of crude mixtures. Thus, in place of the several pure terpene compounds, crude natural mixtures, as for example, turpentine, pine oil, etc., or crude fractions of the mixtures may be reacted without the necessity of isolating the resulting ethers in their pure state, for use in the insecticidal compositions in accordance with this invention. The resulting mixtures of terpene ethers may, and from the standpoint of economy will desirably be used per se in my insecticidal compositions where herein a terpene ether is specified, it will be understood to mean either a pure compound or a mixture prepared from a mixed terpene fraction.

The addition of an alcohol to the double bond of an unsaturated terpene for the production of a terpene ether suitable for use in the insecticidal compositions in accordance with this invention may be carried out by treating the unsaturated terpene compound with an alcohol at a temperature within the range of about 30° C. to about 200° C. and desirably in the presence of a catalyst, such as, for example, p-toluene sulfonic acid, phenol sulfonic acid, benzene sulfonic acid, ethyl sulfonic acid, abietyl sulfonic acid, etc. In carrying out this reaction the alcohol will desirably be in excess of molecular proportions. Thus, to obtain the highest yields of the terpene ether it is desirable to use not less than one and one-half moles and preferably at least three moles of the alcohol per mole of the unsaturated terpene compound. The amount of catalyst used may be varied over a wide range, but will desirably be within the range of about 0.1% to about 25%, calculated by weight as sulfonic acid, of the weight of alcohol in the reaction mixture, and preferably within the range of about 1% to 10%, on the same basis.

Household fly sprays as heretofore prepared commonly consist of a kerosene extract of pyrethrum flowers which is diluted to contain approximately the extractives of 1 pound of pyrethrum flowers in 1 gallon of kerosene, which may be deodorized or straight cut. The only additions to this material would be the use of some perfuming material to counteract the odor of the kerosene. The pyrethrin content of a spray of this type is usually adjusted according to the quality of the pyrethrum flowers. Some sprays may contain as much as the extractives of 1¼ pounds or 1½ pounds of flowers. These sprays may be also manufactured by diluting pyrethrum concentrates in kerosene, for example, the common formula in the industry is 5% of a 20:1 pyrethrum extract and 95% of kerosene. This mixture or composition is generally considered a satisfactory insecticide. In the "Peet-Grady method" of testing fly sprays, a kill of from 60% to 70% with this formula is considered satisfactory. Another method which is sometimes used for testing insecticides of this type and which gives much lower results is the "Campbell method" of testing.

The insecticidal compositions, in accordance with this invention, and their advantages over prior art compositions may be more specifically illustrated by the following:

A series of insecticidal compositions containing different amounts of the terpene ether produced by the direct addition of ethylene glycol to the unsaturated compounds contained in gum turpentine, were prepared. These insecticidal compositions consisted of solutions of the extractives of 1¼ pounds of pyrethrum flowers dissolved in a gallon of deodorized kerosene, containing the percentages of the terpene ethers shown in the table below. The toxic action of each of these solutions to house flies was tested by the "Campbell method" with the results tabulated in the following table:

*Table I*

| Percent terpene ethers | Total number flies | Percent down 10 minutes | Percent dead 24 hours |
|---|---|---|---|
| 0 | 991 | 100 | 15 |
| 2.5 | 991 | 100 | 17 |
| 5.0 | 994 | 100 | 31 |
| 7.5 | 992 | 100 | 39 |
| 10.0 | 998 | 100 | 51 |
| 12.5 | 993 | 100 | 65 |
| 15.0 | 997 | 100 | 74 |

Further tests on these compositions were run by the "Peet-Grady method" to further show the degree of activity exhibited by the terpene ether. The results of these tests are shown in the following table:

*Table II*

| Percent terpene ether | Total number flies | Percent down 10 minutes | Percent dead 24 hours |
|---|---|---|---|
| 0 | 981 | 97 | 66 |
| 5 | 970 | 99 | 81 |
| 8 | 962 | 100 | 81 |
| 10 | 974 | 99 | 96 |

The results presented in Tables I and II definitely show the marked increase in the insecticidal activity of the toxic principles of pyrethrum flowers by a terpene ether. Thus, it will be noted in Table I that the presence of 15% of the terpene ether in the composition increased the per cent kill in 24 hours approximately five-fold by the "Campbell method" of testing. In Table II it will be observed that comparable results were obtained by the "Peet-Grady method" of testing. These tables illustrate the efficiency of the terpene ethers in activating another insecticidal material in a fly spray. Test on other types of insecticidal compositions have shown comparable increases in efficiency.

It will be appreciated from this illustration that by the addition of a terpene ether, an insecticide is obtained which has greater toxic action on insects than the same insecticide not containing a terpene ether. It will be further appreciated that insecticidal compositions can be made more dilute for a given killing power than the same insecticide not containing a terpene ether.

The insecticidal compositions in accordance with this invention and their advantages over prior art compositions are further illustrated by the following:

The activating action of the terpene ethers was compared with that of pine oil by test on a series of compositions containing, respectively, pine oil, the additive methyl ether of terpinolene, and the additive ethylene glycol ether of turpentine. Each of these materials was used in compositions given in the following table:

*Table III*

| Formula | A | B |
|---|---|---|
| | Percent by volume | Percent by volume |
| Pine oil or terpene ether | 5 | 15 |
| 20:1 extract of pyrethrum flowers* | 5 | 2.5 |
| Deodorized kerosene | 90 | 82.5 |

*The extratives of 20 lbs. of pyrethrum flowers in one gallon of kerosene.

Each of these compositions was tested for toxicity to house flies by the "Peet-Grady method" of testing, with the following results:

*Table IV*

| Formula | No. of flies | Knock-down in 10 min. | Kill in 24 hrs. |
|---|---|---|---|
| | | Percent | Percent |
| A (5% pine oil) | 1,018 | 90 | 43 |
| A (5% additive methyl ether of terpineol) | 843 | 90 | 50 |
| A (5% additive ethylene glycol ether of turpentine) | 913 | 99 | 71 |
| B (15% pine oil) | 710 | 100 | 47 |
| B (15% additive methyl ether of terpineol) | 785 | 100 | 78 |
| B (15% additive ethylene glycol ether of turpentine) | 633 | 100 | 94 |

In the above table it will be noted that the terpene ethers contributed a definitely greater toxicity to the compositions tested than did the pine oil. Thus, in the B formulas, the composition containing 15% pine oil actually killed only 47% of the flies in 24 hours, while the corresponding compositions containing the terpene ethers, made in accordance with this invention, killed 78% and 94%, respectively.

As mentioned hereinbefore certain terpene ethers have, in addition to a definite activating action, a remarkable preservative action against deterioration by sunlight for other insecticides, such as, for example, the active principles of pyrethrum, and rotenone bearing plants, etc. This preservative action is illustrated by the following:

Two samples of an insecticide composition having the following formula were prepared:

| | Per cent by volume |
|---|---|
| 20:1 extract of pyrethrum flowers in kerosene * | 5 |
| Additive ethylene glycol ether of turpentine | 10 |
| Deodorized kerosene | 85 |

*The extractives of 20 lbs. of pyrethrum flowers in 1 gallon of kerosene.

One sample was prepared and stored in a clear flint glass bottle in diffuse daylight for a period of six months. At the end of this period the second sample was prepared and both were then tested for toxicity to house flies by the "Peet-Grady" test. The results of these tests follow:

*Table V*

| | No. of flies used | Knock-down in 10 min. | Kill in 24 hrs. |
|---|---|---|---|
| | | Percent | Percent |
| New sample | 512 | 100 | 96 |
| Old sample | 514 | 100 | 94 |

It is well known that under similar conditions of exposure an ordinary pyrethrum extract will lose 50% of its insecticidal efficiency, so it will be appreciated that the preservative action of the terpene ether exemplified by the above table is a very definite improvement.

Insecticidal compositions in accordance with this invention, suitable for use as horticultural sprays, are illustrated by the following:

A series of compositions of the aqueous emulsion type consisting of a 20:1 alcoholic extract of pyrethrum flowers diluted with 1000 parts of water, different percentages of the additive ethylene glycol ether of turpentine, and 0.2% by weight of potassium oleate, on the basis of the weight of the finished compositions. Two comparative compositions consisting of a 20:1 alcoholic extract of pyrethrum flowers (20 lbs. of pyrethrum flowers extracted by 1 gallon of ethyl alcohol) diluted with 1000 and 2000 parts of water, respectively, and 0.2% by weight of potassium oleate, on the basis of the weight of the finished compositions. Each of these compositions was tested for toxicity to nasturtium aphis. The results of these tests are summarized in the following table.

*Table VI*

| Formula No. | Composition | Total number of insects | Number dead in 24 hours | Per cent killed in 24 hours |
|---|---|---|---|---|
| Control A | 1:1000 diluted pyrethrum extract; potassium oleate—0.2% by weight of total composition. | 889 | 541 | 61 |
| Control B | 1:2000 diluted pyrethrum extract; potassium oleate—.2% by weight of total composition. | 692 | 380 | 55 |
| Spray No. 1 | 1:2000 diluted pyrethrum extract; terpene ether—0.05% by wt. of total composition; potassium oleate—0.2% by wt. of total composition. | 1,228 | 822 | 67 |
| Spray No. 2 | 1:2000 diluted pyrethrum extract; terpene ether—0.10% by wt. of total composition; potassium oleate—0.2% by wt. of total composition. | 781 | 599 | 76 |
| Spray No. 3 | 1:2000 diluted pyrethrum extract; terpene ether—0.15% by wt. of total composition; potassium oleate—0.2% by weight of total composition. | 612 | 570 | 93 |

In the above table it will be noted that the addition of 0.05%, 0.10%, and 0.15%, respectively, of the additive ethylene glycol ether of turpentine to the pyrethrum spray increased the kill by 12%, 21% and 38%, respectively. These increases in the percentage killed are quite marked, as will be appreciated when it is noted that the kill was increased only 6% by doubling the pyrethrum content of control B, in control A.

It will be understood that the details and examples hereinbefore set forth are illustrative only and that the invention as herein broadly described and claimed is in no way limited thereby.

It will be understood that the term "additive terpene ethers" as used in the claims designates a terpene ether produced by the direct addition of an alcohol to an unsaturated terpene compound as hereinbefore described.

What I claim and desire to protect by Letters Patent is:

1. An insecticidal composition comprising an ether of a terpene and an alcohol.
2. An insecticidal composition comprising an additive ether of a terpene and an alcohol.
3. An insecticidal composition comprising an additive ether of a terpene and an alcohol, a contact insecticide extracted from a plant body and a carrier.
4. An insecticidal composition comprising the additive ether of ethylene glycol and turpentine, a contact insecticide extracted from a plant body and a carrier.
5. An insecticidal composition comprising the additive ether of ethylene glycol and turpentine, the extractives of pyrethrum flowers and a carrier.
6. An insecticidal composition comprising the additive ether of ethylene glycol and turpentine, rotenone, and a carrier.
7. An insecticide composition comprising an additive ether of a terpene and an aliphatic alcohol, a contact insecticide extracted from a plant body and a carrier.
8. An insecticidal composition comprising an additive ether of a terpene and an alcohol, and a powdered plant insecticidal material.
9. An insecticidal composition comprising the additive ether of ethylene glycol and turpentine, and powdered derris root.

FRIAR M. THOMPSON, JR.